United States Patent [19]
Haardt et al.

[11] Patent Number: 5,252,270
[45] Date of Patent: Oct. 12, 1993

[54] METHOD OF FORMING FOAM MOLDINGS HAVING VARIED DENSITY REGIONS

[75] Inventors: Udo Haardt, Biblis; Hermann Tatzel, Weinheim, both of Fed. Rep. of Germany

[73] Assignee: BASF Aktiengesellschaft, Ludwigshafen, Fed. Rep. of Germany

[21] Appl. No.: 879,431

[22] Filed: May 6, 1992

Related U.S. Application Data

[62] Division of Ser. No. 809,373, Dec. 18, 1991, Pat. No. 5,164,257.

[30] Foreign Application Priority Data

Dec. 20, 1990 [DE] Fed. Rep. of Germany ....... 4040908

[51] Int. Cl.$^5$ ............................................. B29C 67/22
[52] U.S. Cl. .................. 264/45.4; 264/45.1; 264/51; 264/126
[58] Field of Search ....................... 264/45.1, 45.4, 51, 264/126

[56] References Cited

U.S. PATENT DOCUMENTS

| | | | |
|---|---|---|---|
| 3,919,370 | 11/1975 | Cotterell | 264/45.4 |
| 4,031,179 | 6/1977 | Tatzel et al. | 264/126 |
| 4,206,166 | 6/1980 | Hayashi et al. | 264/126 |
| 4,608,213 | 8/1986 | Kurumizawa et al. | 264/45.1 |
| 4,756,859 | 7/1988 | Cretti | 264/45.4 |
| 5,085,814 | 2/1992 | Kamiyama et al. | 264/126 |
| 5,143,664 | 9/1992 | Noguchi et al. | 264/126 |

FOREIGN PATENT DOCUMENTS

| | | |
|---|---|---|
| 2741342 | 3/1979 | Fed. Rep. of Germany . |
| 3136044 | 3/1983 | Fed. Rep. of Germany . |
| 54108870 | 8/1979 | Japan . |
| 58-171922 | 10/1983 | Japan ................ 264/45.4 |
| 58-215327 | 12/1983 | Japan ................ 264/45.4 |
| 1578045 | 10/1980 | United Kingdom . |

*Primary Examiner*—Allan R. Kuhns
*Attorney, Agent, or Firm*—Keil & Weinkauf

[57] ABSTRACT

Moldings made from polyolefin particle foams having a mean density of from 0.015 to 0.100 g/cm$^3$ and having at least two different regions whose densities differ by from 0.005 to 0.030 g/cm$^3$ have a transition zone between the different density regions having a thickness of not more than 25 mm. A method of forming the moldings, using removable mold dividing walls, is described.

4 Claims, 1 Drawing Sheet

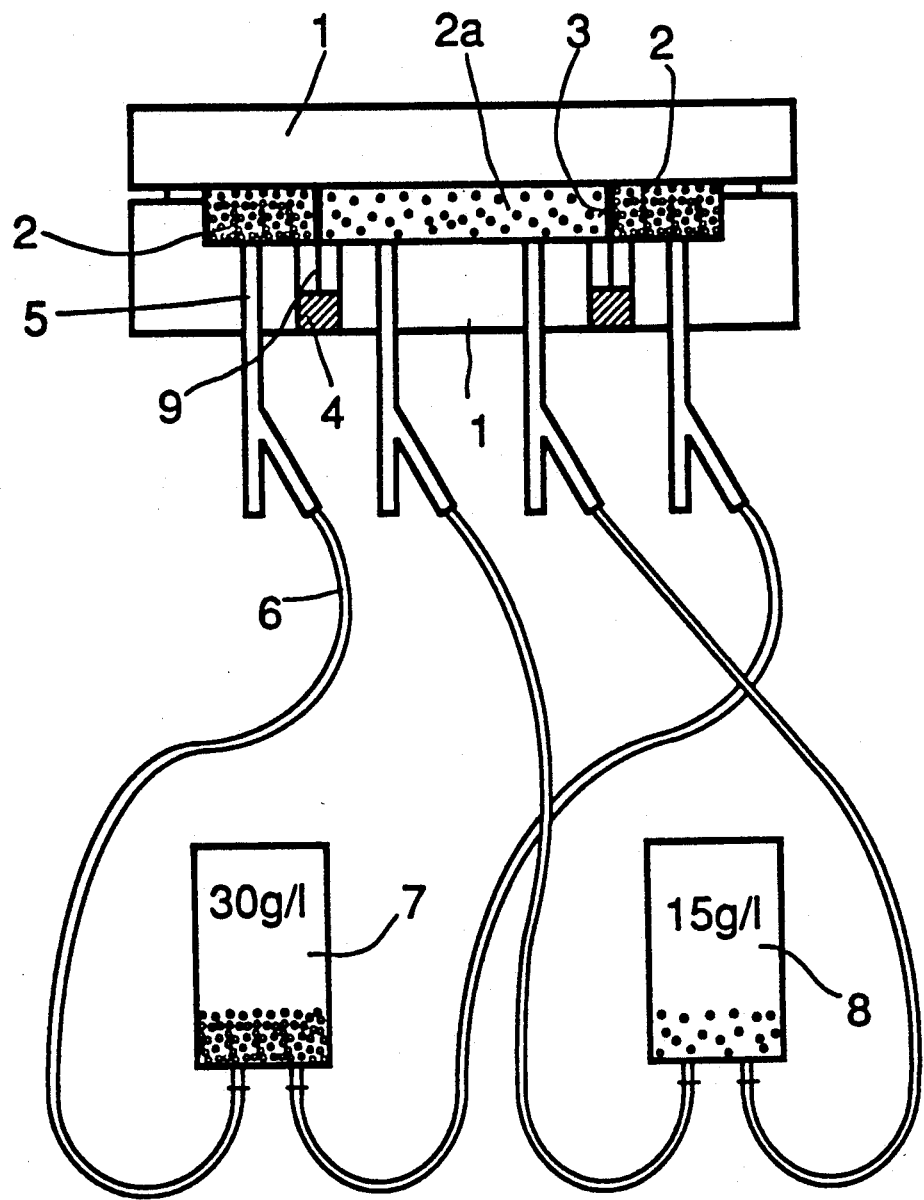

METHOD OF FORMING FOAM MOLDINGS HAVING VARIED DENSITY REGIONS

This is a divisional of application Ser. No. 07/809,373, filed Dec. 18, 1991, now U.S. Pat. No. 5,164,257.

BACKGROUND OF THE INVENTION

The present invention relates to a polyolefin particle foam molding having various density regions.

Moldings made from polyolefin particle foams have achieved considerable importance as shock-absorbing packaging and packaging parts and as shock-absorbing parts in the strengthening of motor vehicles, for example as the core of bumpers, consoles, dashboards or the like. In accordance with the desired mechanical properties of the molding, the individual moldings vary in density and thickness.

SUMMARY OF THE INVENTION

It is an object of the present invention to provide moldings which have zones of various ability to withstand mechanical load. Obvious materials for this purpose were polyolefin particle foams having various density regions. It proved to be too technically complicated to bond individual parts of different density, and welding individual parts of this type did not give usable moldings either.

We have found that, surprisingly, this object is achieved by moldings produced, in a simple manner, in a mold having removable dividing walls.

The present invention accordingly provides a polyolefin particle foam molding having a mean density of from 0.015 to 0.100 g/cm$^3$ and having at least two different regions whose densities differ by from 0.005 to 0.030 g/cm$^3$, the transition zone between the different density regions having a thickness of not more than 25 mm.

The present invention furthermore provides a process for the production of moldings of this type, which comprises introducing fillings of various density made from polyolefin foam particles into the individual chambers of a mold divided into at least two chambers by removable dividing walls, removing the dividing walls, and heating the particles by passing steam or hot air into the mold so that they soften, expand and weld to one another.

The present invention furthermore provides a mold for carrying out this process, wherein the cavity of the mold is divided into at least two chambers by dividing walls, the chambers being connected via supply lines to storage tanks for polyolefin foam particles of the same or different density, and the dividing walls being designed as retractable cores connected to pressure cylinders via rods.

BRIEF DESCRIPTION OF THE DRAWING

The FIGURE illustrates a schematic diagram of an apparatus used to mold a foamed composite article according to the invention.

DETAILED DESCRIPTION OF THE INVENTION

The moldings according to the invention essentially comprise a particle foam based on a polyolefin. Examples of suitable polyolefins are homopolymers and copolymers of ethylene and propylene. Preference is given to propylene copolymers having a melting point of from 125° to 155° C., preferably from 130° to 150° C., in particular from 140° to 150° C. The melting point given here is the maximum determined by the DSC method on the second melting of a sample (crystallite melting point). Copolymers of propylene containing from 1 to 30% by weight, in particular from 1 to 6% by weight, of ethylene and/or a C$_4$- to C$_6$-α-olefin are particularly suitable.

The foam is a particle foam, as obtainable by welding foam particles, usually having a mean diameter of from 2 to 8 mm, preferably from 3 to 6 mm. The mean density of the foam, i.e. the density averaged over all the density regions of the molding, is from 0.015 to 0.100 g/cm$^3$, preferably from 0.020 to 0.090 g/cm$^3$, in particular from 0.030 to 0.080 g/cm$^3$.

The molding has regions of different density, with the zones which can withstand higher load having higher density. The density difference is generally from 0.005 to 0.030 g/cm$^3$, in particular from 0.010 to 0.025 g/cm$^3$. The transition zone between the various density regions is relatively narrow and has a thickness of not more than 25 mm. In general, the thickness of this zone corresponds to 1 to 4 times the diameter of the foam particles used.

The foam may also contain, in the individual regions, conventional additives such as dyes, pigments, fillers, reinforcing substances, flameproofing agents, release agents, antistatics, stabilizers and other assistants in effective amounts.

The moldings are preferably used in motor vehicle manufacture, for example as door panels, dashboards, consoles, sun visors, bumpers and the like.

The moldings according to the invention are advantageously produced, as shown in the drawing, in a mold whose cavity is divided into at least two chambers 2, 2a by removable dividing walls 3. Foam particle fillings of different density are introduced into the chambers (2, 2a), in accordance with the requirements for the moldings. The different filling densities can be produced either by using particles of different density in the individual chambers or by using particles of the same density, but introducing different amounts per volume unit into the individual chambers. In the example shown in the drawing, the chambers 2, 2a are initially separated from one another by the dividing walls 3 and are filled with foam particles of different density from the storage tanks 7, 8 via the supply lines 5, 6. The filling of the chambers is generally effected by compressed air, the pressure used, for example an excess pressure of from 0.5 to 5 bar, causing a certain compression of the particles. By varying the pressure or by subsequent compression, different fill amounts per volume unit can easily be introduced into the chambers. After decompression, the particles attempt to expand again and pack against one another in such a manner that virtually no movement of materials in the mold takes place when the dividing walls are withdrawn. After the filling operation, the dividing walls 3 are removed from the mold by means of the rods 9 and the pressure cylinders 4, and the mold is heated using steam or hot air so that the foam particles soften, expand and weld to one another. After subsequent cooling, the molding can be removed from the mold.

We claim:

1. A process for the production of a molding having a mean density of from 0.015 to 0.100 g/cm$^3$ and having at least two different regions whose densities differ by from 0.005 to 0.030 g/cm$^3$, the transition zone between the different density regions having a thickness of not more than 25 mm, which process comprises introducing polyolefin foam particles having substantially the same density into individual chambers of a mold divided into at least two chambers by removable dividing walls, said chambers being filled at different pressures or applying different degrees of compression to the particles after the chambers have been filled, thereby providing regions of different density, removing the divided walls, and heating the particles by passing steam or hot air into the mold so that they soften, expand and weld to one another.

2. A process for the production of a molding as defined in claim 1, wherein the molding comprises a particle foam based on a propylene copolymer having a melting point of from 125° to 155° C.

3. The process of claim 1 wherein the chambers are filled with particles at different pressures.

4. The process of claim 1, wherein the particles in the different chambers are subjected to different degrees of compression.